(12) United States Patent
Kim

(10) Patent No.: US 12,197,230 B2
(45) Date of Patent: Jan. 14, 2025

(54) HUB APPARATUS AND METHOD FOR CONTROLLING PLATOONING

(71) Applicants: HYUNDAI MOTOR COMPANY, Seoul (KR); KIA CORPORATION, Seoul (KR)

(72) Inventor: Dong Hyuk Kim, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 218 days.

(21) Appl. No.: 17/378,066

(22) Filed: Jul. 16, 2021

(65) Prior Publication Data
US 2022/0197305 A1    Jun. 23, 2022

(30) Foreign Application Priority Data

Dec. 22, 2020    (KR) .................. 10-2020-0181035

(51) Int. Cl.
| | |
|---|---|
| *G05D 1/00* | (2024.01) |
| *B60W 30/06* | (2006.01) |
| *G07C 5/00* | (2006.01) |
| *G07C 5/08* | (2006.01) |
| *G08G 1/00* | (2006.01) |

(52) U.S. Cl.
CPC .......... *G05D 1/0293* (2013.01); *B60W 30/06* (2013.01); *G07C 5/006* (2013.01); *G07C 5/0808* (2013.01); *G08G 1/22* (2013.01)

(58) Field of Classification Search
CPC .................................................. G05D 1/0293
See application file for complete search history.

(56) References Cited

U.S. PATENT DOCUMENTS

| | | | |
|---|---|---|---|
| 10,423,934 B1 * | 9/2019 | Zanghi ............... | G06Q 10/1097 |
| 2017/0329346 A1 * | 11/2017 | Latotzki ................ | G08G 1/202 |
| 2018/0012156 A1 * | 1/2018 | Voelz ................ | G05D 1/0285 |
| 2019/0311616 A1 * | 10/2019 | Jin ........................ | G05D 1/0297 |
| 2020/0174496 A1 * | 6/2020 | Hase ..................... | H04W 84/20 |
| 2020/0298882 A1 * | 9/2020 | Kobayashi ........... | B60W 40/04 |
| 2021/0171019 A1 * | 6/2021 | Sugano ................ | G05D 1/0274 |

FOREIGN PATENT DOCUMENTS

| | | |
|---|---|---|
| KR | 10-2231830 B | 3/2021 |
| WO | WO-2021042293 A1 * | 3/2021 |

* cited by examiner

*Primary Examiner* — Aniss Chad
*Assistant Examiner* — Richard J Schuler
(74) *Attorney, Agent, or Firm* — MORGAN, LEWIS & BOCKIUS LLP

(57) ABSTRACT

A hub apparatus for platooning control and a method are provided. A hub apparatus for controlling platooning includes: a processor configured to control at least one of entry, parking, or exit of a platooning vehicle; and a storage configured to store data and algorithms driven by the processor, wherein the processor is configured to control the vehicle to move to a parking position within a hub based on autonomous driving control after a driver exits the vehicle when the vehicle arrives at a gate of the hub.

19 Claims, 11 Drawing Sheets

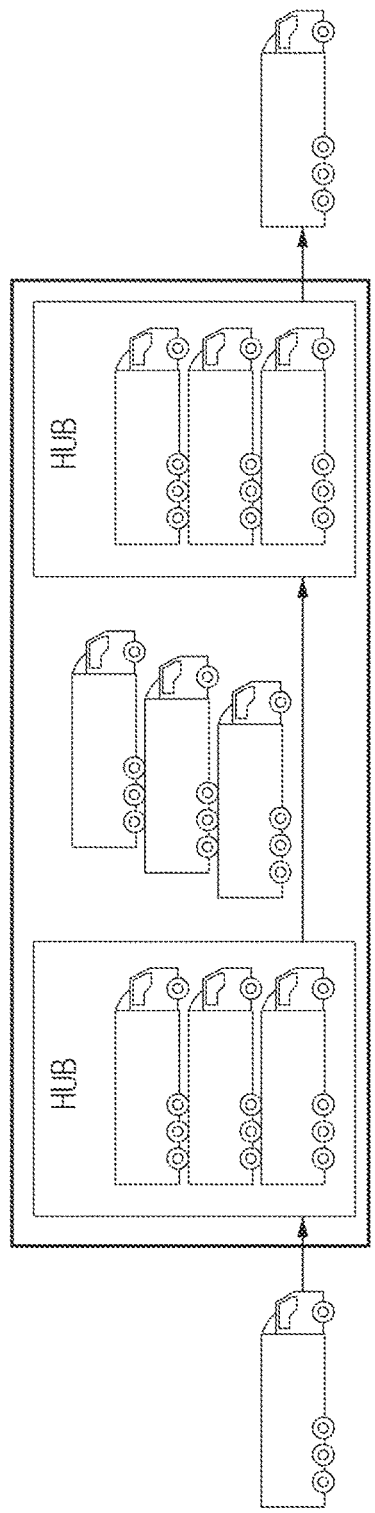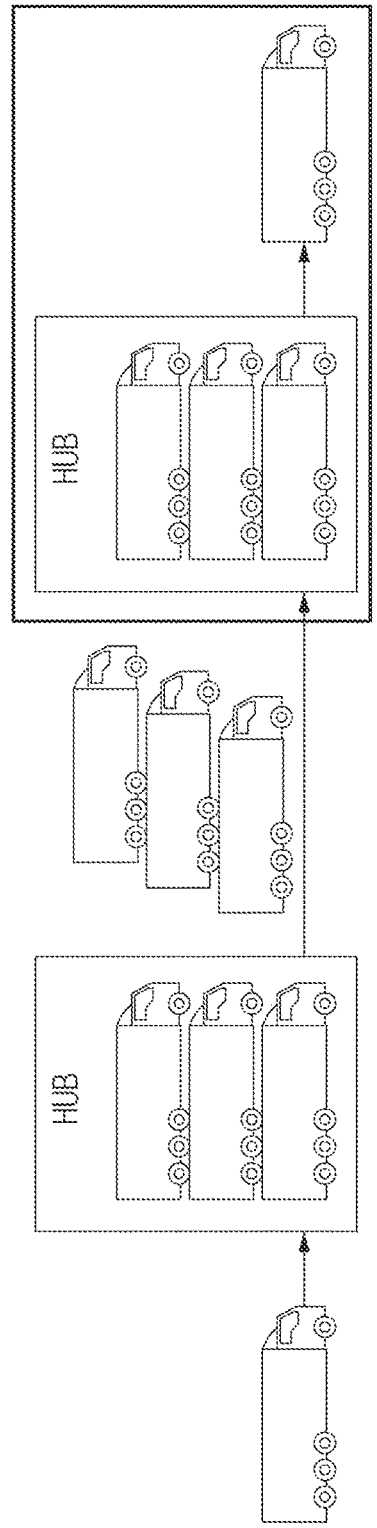

HUB APPARATUS AND METHOD FOR CONTROLLING PLATOONING

CROSS-REFERENCE TO RELATED APPLICATION

This application claims priority to and benefits of Korean Patent Application No. 10-2020-0181035, filed in the Korean Intellectual Property Office on Dec. 22, 2020, the entire contents of which are incorporated herein by reference.

TECHNICAL FIELD

The present disclosure relates to a hub apparatus for platooning control and a method thereof, and more particularly, to a technique for controlling entry, parking alignment, and exit of a platooning vehicle on a hub to hub (HUB to HUB) basis.

BACKGROUND

Currently, a logistics transport system is widely distributed in the form of hub-and-spoke thanks to a synergy effect of clustering of infrastructure facilities and industries, and recently, a network has been established to transport logistics to each region centered on hubs such as airports or terminals, and large-scale collection-type logistics transport using economies of scale has been achieved.

Platooning is a technique for performing autonomous driving in a state in which a plurality of vehicles are disposed in a line at predetermined intervals. A leading vehicle, which is a vehicle positioned at a forefront of a platooning vehicle group, may control one or more following vehicles following the leading vehicle while performing platooning.

Conventionally, when a platooning vehicle arrives at a hub, there is a hassle of having to go through a request procedure and an approval procedure for creating and releasing a platooning vehicle group between the leading vehicle and the following vehicle, and thus it is necessary to increase platooning efficiency by controlling generation of the platooning vehicle directly in the hub.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a hub apparatus for controlling platooning and a method thereof, capable of maximizing platooning efficiency by creating a platooning vehicle group with vehicles parked in a hub based on hub-to-hub platooning control and by directly performing vehicle door control, vehicle starting control, and vehicle driving control in the hub.

The technical objects of the present disclosure are not limited to the objects mentioned above, and other technical objects not mentioned can be clearly understood by those skilled in the art from the description of the claims.

An exemplary form of the present disclosure provides a hub apparatus for controlling platooning, including: a processor configured to control at least one of entry, parking, and exit of a platooning vehicle; and a storage configured to store data and algorithms driven by the processor, wherein the processor controls the vehicle to move to a parking position within a hub based on autonomous driving control after a driver is out of the vehicle when the vehicle arrives at a gate of the hub.

In some forms of the present disclosure, the processor may create a platooning plan, and registers vehicles before arriving at the gate of the hub in a platooning waiting list by pre-receiving vehicle information and/or load information from the vehicles.

In some forms of the present disclosure, the processor may determine whether pre-entry approval of the vehicle is made based on the platooning waiting list when the vehicle arrives at the gate of the hub.

In some forms of the present disclosure, the processor may create a plurality of paths to a destination based on vehicle information for each vehicle and transmits them to the vehicles, and makes the platooning plan based on at least one of the paths selected from the vehicles, a platooning departure time, a platooning creation place, vehicle information to participate in a platooning vehicle group, and platooning role information.

In some forms of the present disclosure, the processor may determine parking positions in the hub of vehicles that are to participate in a platooning vehicle group based on a platooning departure time and platooning role information.

In some forms of the present disclosure, the processor may perform a fault diagnosis of the vehicle when the vehicle arrives at a parking position in the hub.

In some forms of the present disclosure, the processor may control the vehicle to move to a maintenance position in the hub when the vehicle is in a fault condition as a result of the fault diagnosis. In some forms of the present disclosure, the processor may perform start-off control of the vehicle when it is in a normal state as a result of the failure diagnosis of the vehicle In some forms of the present disclosure, the processor may perform door lock control of the vehicle after starting-off control of the vehicle.

In some forms of the present disclosure, the processor may determine whether the vehicle arriving at the entry gate is a vehicle to move to another hub or a last mile vehicle.

In some forms of the present disclosure, the processor may determine whether the vehicle is a leading vehicle when the vehicle is a vehicle to be moved to another hub.

In some forms of the present disclosure, the processor, when the vehicle is the leading vehicle, may determine whether a parking space exists at a front region of parking rows within the hub, and when the parking space exists at the front one of the parking rows within the hub, may transmit a parking position of the parking space at the front region of the parking rows within the hub to the vehicle, to control the vehicle to move to the parking space at the front region of the parking rows within the hub.

In some forms of the present disclosure, the processor, when no parking space exists at the front one of the parking rows within the hub, may determine whether a parking space exists at a back region of a platooning vehicle group having a fastest departure time among platooning vehicle groups that have been completed platooning parking.

In some forms of the present disclosure, the processor, when the parking space exists at the back region of the platooning vehicle group having the fastest departure time, may control the vehicle to move to the parking space at the back region of the platooning vehicle group having the fastest departure time, may park the vehicle at the parking space at the back region of the platooning vehicle group having the fastest departure time to wait, and may change a parking position of the vehicle by controlling the vehicle to move to a front region of a parking space at which the platooning vehicle group having the fastest departure time has been parked after leaving.

In some forms of the present disclosure, the processor, when no parking space exists a back region of the platooning vehicle group having the fastest departure time, may control the vehicle to move to a temporary waiting space and to be parked and then wait.

In some forms of the present disclosure, the processor, when the vehicle is a following vehicle, may determine whether a parking space exits at a back region of a same platooning vehicle group as that of the vehicle, and when the parking space exists at the back region of the same platooning vehicle group as that of the vehicle, may control the vehicle to move to the parking space at the back region of the same platooning vehicle group as that of the vehicle, but, when no parking space exists at the back region of the same platooning vehicle group as that of the vehicle, may controls the vehicle to move to a temporary waiting space and to be parked and then wait.

In some forms of the present disclosure, the processor, when a vehicle arriving at the entry gate is a last mile vehicle, may determine whether a parking space exists at a back region of a platooning vehicle group having a fastest departure time among platooning vehicle groups that have been completed platooning parking, and when the parking space exists at the back region of the platooning vehicle group having the fastest departure time, may control the vehicle to move to the parking space at the back region of the platooning vehicle group having the fastest departure time, and may park the vehicle at the parking space at the back region of the platooning vehicle group having the fastest departure time to wait, and may change a parking position of the vehicle by controlling the vehicle to move to a front region of a parking space at which the platooning vehicle group having the fastest departure time has been parked after leaving.

In some forms of the present disclosure, the processor may check a destination and an exit time of the vehicle and determines whether or not adjustment of a parking position of a vehicle for exit is necessary, and when it is necessary to adjust the parking position of the vehicle, may control the vehicle to move to a changed parking position by transmitting the changed parking position to the vehicle.

In some forms of the present disclosure, the processor may control the vehicle to move to a driver boarding position when the vehicle leaves.

One form of the present disclosure provides a hub method for controlling platooning as a platooning control method for controlling a platooning vehicle on a hub to hub basis, the method including: determining whether or not to make pre-entry approval of the vehicle when the vehicle arrives at a hub of a gate; and controls the vehicle to move to a parking position within a hub based on autonomous driving control after a driver is out of the vehicle when the pre-entry approval is made.

In some forms of the present disclosure, it is possible to maximize platooning efficiency by creating a platooning group with vehicles parked in a hub based on hub-to-hub platooning control and by directly performing vehicle door control, vehicle starting control, and vehicle driving control in the hub.

In addition, various effects that can be directly or indirectly identified through this document may be provided.

DRAWINGS

FIG. 2A to FIG. 2D illustrate views for describing a basic concept of a hub for platooning in some forms of the present disclosure.

DETAILED DESCRIPTION

Figure 1:
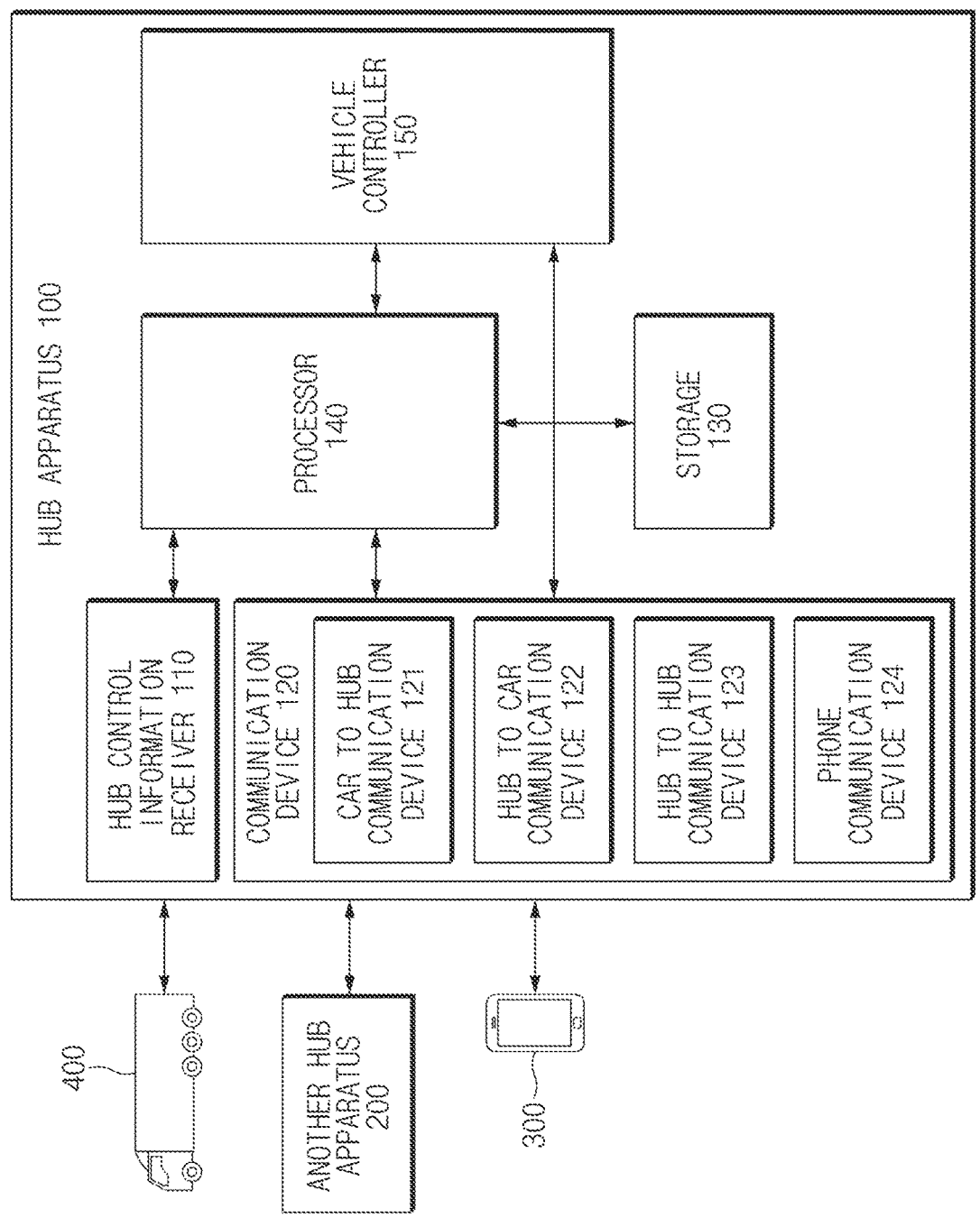
FIG. 1 illustrates a block diagram showing a configuration of a hub apparatus for hub-to-hub-based platooning control in some forms of the present disclosure.

Hereinafter, some forms of the present disclosure will be described in detail with reference to exemplary drawings. It should be noted that in adding reference numerals to constituent elements of each drawing, the same constituent elements have the same reference numerals as possible even though they are indicated on different drawings. In addition, in describing some forms of the present disclosure, when it is determined that detailed descriptions of related well-known configurations or functions interfere with understanding of the exemplary forms of the present disclosure, the detailed descriptions thereof will be omitted.

In describing constituent elements in some forms of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary forms of the present disclosure will be described in detail with reference to FIG. 1 to FIG. 10.

A leading vehicle LV and following vehicles FV included in a platooning vehicle group may perform platooning on a road. The leading vehicle LV and the following vehicles FV may be driven while maintaining a predetermined distance. While driving, the leading vehicle LV or the following vehicles FV may adjust a distance between the leading vehicle LV and the following vehicles FV based on sensor information and platooning information shared through V2V communication.

Platooning vehicles that create such a platooning vehicle group are arranged and parked in a hub, and then start together.

In some forms of the present disclosure, a hub apparatus 100 may perform entry, parking alignment, and exit control of platooning vehicles in an unmanned hub.

FIG. 1 illustrates a block diagram showing a configuration of a hub apparatus for hub-to-hub-based platooning control in some forms of the present disclosure.

Referring to FIG. 1, the hub apparatus 100 for hub-to-hub-based platooning control in some forms of the present disclosure includes a hub control information receiver 110, a communication device 120, a storage 130, a processor 140, and a vehicle controller 150.

The hub apparatus 100 for hub-to-hub-based platooning control in some forms of the present disclosure may be implemented in a hub, a platooning center, and/or the like.

The hub apparatus 100 may control at least one of entry, parking, and exit of the platooning vehicle on a hub-to-hub basis.

The hub control information receiver 110 may receive hub control information from a center (not illustrated) that controls the hub. Herein, the hub control information may include vehicle position in the hub, vehicle entry or exit time information, and the like.

The communication device 110, which is a hardware device implemented with various electronic circuits to transmit and receive signals through a wireless or wired connection, may communicate with platooning vehicles 400, other hub apparatus 200, and user terminals 300 of drivers of the platooning vehicle.

As an example, the communication device 120 may perform communication with an external server, infrastructure, or a platooning vehicle through wireless Internet access or a short range communication technique. Herein, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

As an example, the communication device 120 may share platooning information, vehicle information, load information, and the like by performing V2X communication with the platooning vehicles. In this case, the platooning information may include information such as a platooning speed, an inter-vehicle distance, a destination, and a path. The vehicle information may include a vehicle type, engine information, driver information, contact information, driving path information based on loading and unloading information inputted by a driver, a waiting place (rest area), an available waiting time, and a driving speed (preferred). The load information may information destination information, load shipment time information, load type information, and the like.

The communication device 120 may include a car to hub communication device 121 performing communication between a vehicle and a hub, a hub to car communication device 122 that performs communication between the hub and the vehicle, a hub to hub communication device 123 that performs communication between the hub and the hub, and a phone communication device 124 performing communication with a user terminal 300.

The storage 130 may store data and/or algorithms required for the processor 140 to operate, and the like.

As an example, the storage 130 may store vehicle information, load information, platooning waiting list, parking position information in a hub, platooning information, etc. obtained from platooning vehicles. The platooning information may include information such as a destination, a route, a departure time, and a platooning creation place.

The storage 130 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 140 may be electrically connected to the hub control information receiver 110, the communication device 120, the storage 130, the vehicle controller 150, and the like, may electrically control each component, and may be an electrical circuit that executes software commands, thereby performing various data processing and calculations described below.

The processor 140 may process signals transferred between the components of the hub apparatus 100 for hub-to-hub-based platooning control, and may control at least one of entry, parking alignment, and exit of the platooning vehicle.

When a vehicle arrives at an entry gate of the hub, the processor 140 may control the vehicle to move to a parking position in the hub based on autonomous driving control after a driver is out of the vehicle.

The processor 140 may create a platooning plan before or when the vehicle arrives at the hub gate, and may register vehicles in a platooning waiting list by receiving vehicle information and/or load information in advance from vehicles for platooning vehicle group creation before arrival at the hub gate.

When the vehicle arrives at the hub gate, the processor 140 may determine whether pre-entry approval of the vehicle is made based on the platooning waiting list.

The processor 140 may create a plurality of paths to a destination based on vehicle information for each vehicle and transmits them to the vehicles, and may make a platooning plan based on at least one of the paths selected from vehicles, a platooning departure time, a platooning creation place, vehicle information to participate in the platooning vehicle group, and platooning role information In addition, the platooning plan may include platooning vehicle group information.

The processor 140 may determine parking positions in the hub of vehicles that are to participate in the platooning vehicle group based on a platooning departure time and platooning role information, and may control movement of the unmanned vehicles to the parking positions in the hub based on autonomous driving control after a driver gets off when the vehicle arrives at the entry gate of the hub. That is, the processor 140 transmits parking position information in the hub to the vehicles, and the vehicles moves to the corresponding parking positions based on autonomous driving control.

In the case where a vehicle arrives at the parking position in the hub, the processor 140 may perform a fault diagnosis of the vehicle, and when the vehicle is in a fault condition as a result of the fault diagnosis, may control the vehicle to move to a maintenance position in the hub, allowing the vehicle to be repaired at the maintenance position.

The processor 140 may perform starting-off control of the vehicle when it is in a normal state as a result of the failure diagnosis of the vehicle, and may perform door lock control of the vehicle after starting-off control of the vehicle. The processor 140 may determine whether the vehicle arriving at the entry gate is a vehicle to move to another hub or a last mile vehicle.

First mile refers to the section in which raw material procurement, production, and finished products are delivered to distribution bases and retailers, and last mile refers to a last step in a process of delivering purchased products immediately before meeting consumers.

Thus, the last mile vehicle refers to a vehicle that is unloaded to be sold to consumers. A vehicle that will move to another hub refers to a vehicle that needs to wait at the hub.

In the case where the vehicle is a vehicle to be moved to another hub, the processor 140 determines whether the vehicle is a leading vehicle LV, when the vehicle is the leading vehicle LV, determines whether a parking space exists at a front region of parking rows within the hub, and when the parking space exists at the front one of the parking rows within the hub, transmits a parking position of the parking space at the front region of the parking rows within the hub to the vehicle, to control the vehicle to move to the parking space at the front region of the parking rows within the hub.

In addition, in the case where no parking space exists at the front one of the parking rows within the hub, the processor 140 determines whether a parking space exists at a back region of a platooning vehicle group having a fastest departure time among platooning vehicle groups that have been completed platooning parking, and when the parking space exists at the back region of the platooning vehicle group having the fastest departure time, controls the vehicle to move to the parking space at the back region of the platooning vehicle group having the fastest departure time, and parks the vehicle at the parking space at the back region of the platooning vehicle group having the fastest departure time to wait.

On the other hand, the processor 140 may change a parking position of the vehicle by controlling the vehicle to move to a front region of a parking space at which the platooning vehicle group having the fastest departure time has been parked after leaving.

When no parking space exists a back region of the platooning vehicle group having the fastest departure time, the processor 140 may control the vehicle to move to a temporary waiting space and to be parked and then wait.

In the case where a vehicle reaching the entry gate of the hub is a following vehicle, the processor 140 may determine whether a parking space exits at a back region of a same platooning vehicle group as that of the vehicle, and when the parking space exists at the back region of the same platooning vehicle group as that of the vehicle, may control the vehicle to move to the parking space at the back region of the same platooning vehicle group as that of the vehicle, but when no parking space exists at the back region of the same platooning vehicle group as that of the vehicle, may control the vehicle to move to a temporary waiting space and to be parked and then wait.

In addition, in the case where a vehicle arriving at the entry gate is a last mile vehicle, the processor 140 may determine whether a parking space exists at a back region of a platooning vehicle group having a fastest departure time among platooning vehicle groups that have been completed platooning parking, and when the parking space exists at the back region of the platooning vehicle group having the fastest departure time, may control the vehicle to move to the parking space at the back region of the platooning vehicle group having the fastest departure time, park the vehicle at the parking space at the back region of the platooning vehicle group having the fastest departure time to wait, and change a parking position of the vehicle by controlling the vehicle to move to a front region of a parking space at which the platooning vehicle group having the fastest departure time has been parked after leaving.

The processor 140 checks a destination and an exit time of the vehicle and determines whether or not adjustment of a parking position of a vehicle for exit is necessary, and when it is necessary to adjust the parking position of the vehicle, controls the vehicle to move to a changed parking position by transmitting the changed parking position to the vehicle.

The processor 140 may control the vehicle to move to a driver boarding position when the vehicle leaves.

The vehicle controller 150 may control starting, door, and driving of a vehicle. That is, the vehicle controller 150 may control the starting of the vehicle or on-off of a door.

The vehicle controller 150 may be configured to control braking of the vehicle, may be configured to control engine driving of the vehicle, and may include a controller that controls a speed of the vehicle.

FIG. 2A to FIG. 2D illustrate views for describing a basic concept of a hub for platooning in some forms of the present disclosure.

Figure 2A:
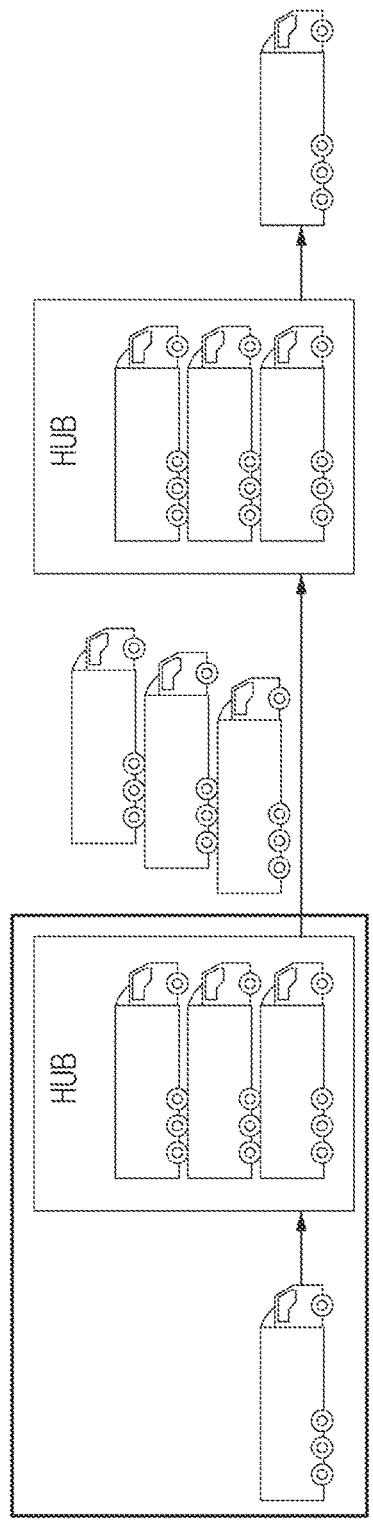
Figure 2B:
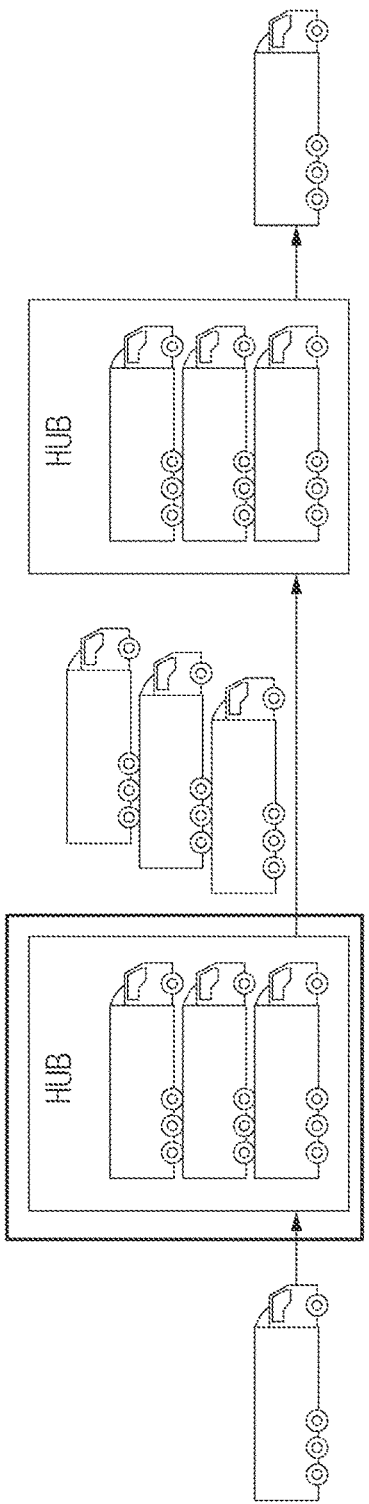

Referring to FIG. 2A, one vehicle enters the hub in a first mile section, and the hub apparatus 100 transmits a parking position in the hub to the vehicle and prepares for platooning plan creation. As illustrated in FIG. 2B, a plurality of platooning vehicles are waiting at the hub. The hub apparatus controls the platooning vehicles that have been waiting to travel by platooning to another hub through vehicle security authentication of the vehicles, door control, starting control, and driving control.

As illustrated in FIG. 2C, when entering into another hub, a hub apparatus in another hub transmits parking position information to vehicles, and after vehicle security functions, door control, starting control, driving control, and destination delivery notification, they leave one by one to a last mile section as illustrated in FIG. 2D.

Figure 3:
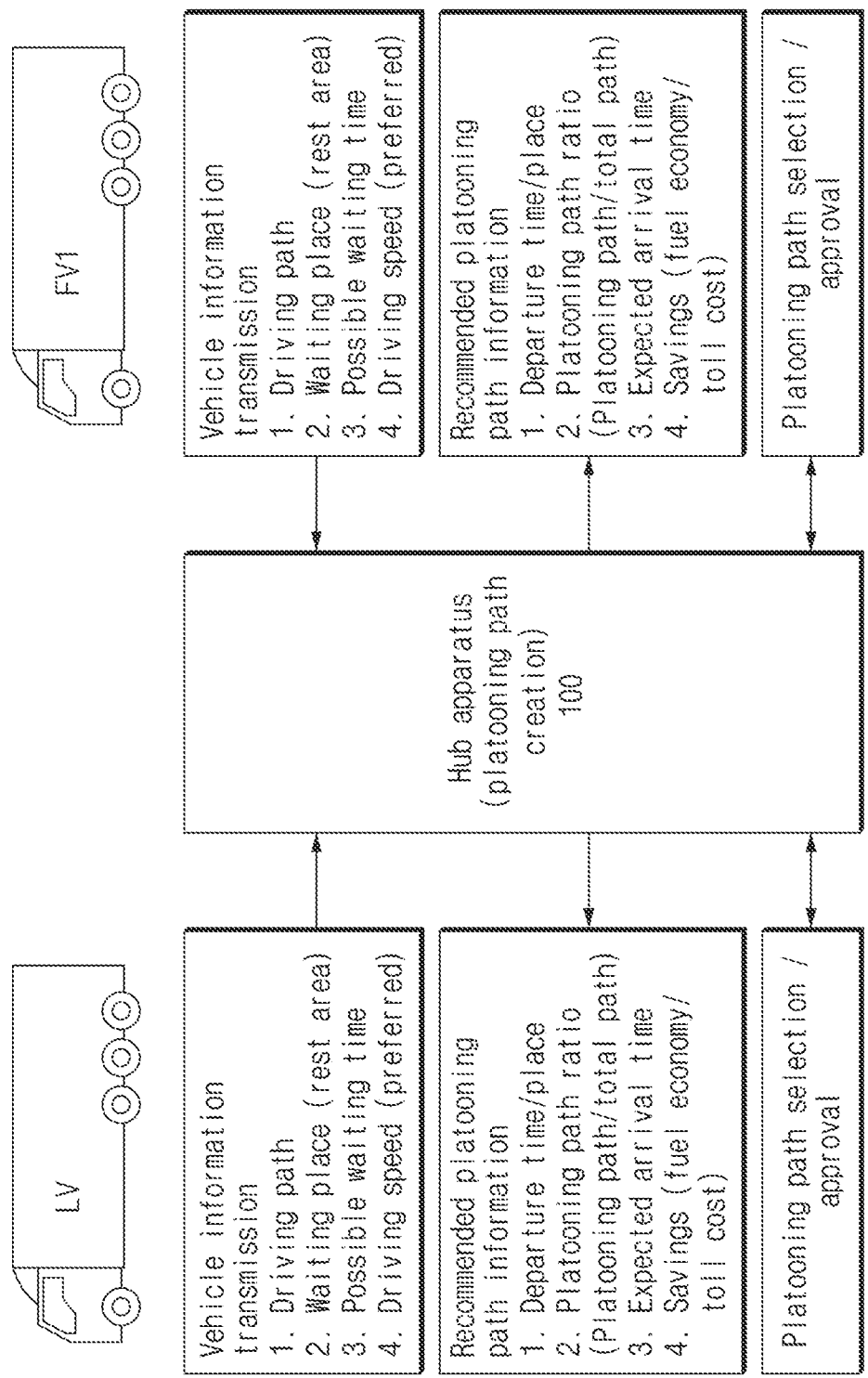
FIG. 3 illustrates an example of a screen of transmission/reception information between a hub apparatus and a platooning vehicle in some forms of the present disclosure.

FIG. 3 illustrates an example of a screen of transmission/reception information between a hub apparatus and a platooning vehicle in some forms of the present disclosure.

Referring to FIG. 3, during platooning, a leading vehicle LV and a following vehicle FV1 transmit vehicle information to the hub apparatus 100. In this case, the vehicle information may include driving path information, a waiting place (rest area), a possible waiting time, and a driving speed (preferred) based on loading and unloading information inputted by a driver.

The hub apparatus 100 may create an optimal platooning path by using the received vehicle information and transmit recommended platooning path information to the platooning vehicles LV and FV1. The recommended platooning path information may include a departure time, a departure place, a platooning path ratio (platooning path/total path), an expected arrival time, and savings (fuel economy, toll cost), and the like.

Selection and approval of the platooning path may be transmitted and received between the hub apparatus 100 and the platooning vehicles LV and FV1. That is, the hub apparatus 100 may receive platooning path selection information from the platooning vehicles LV and FV1 and perform a final confirmation procedure between the vehicles, and may transmit a departure time, a platooning creation place, and the like to the platooning vehicles LV and FV1 such that the platooning can be finally created FIG. 4 illustrates an example of a screen for parking alignment of a platooning vehicle within a hub for hub-to-hub-based platooning control in some forms of the present disclosure.

Figure 4:
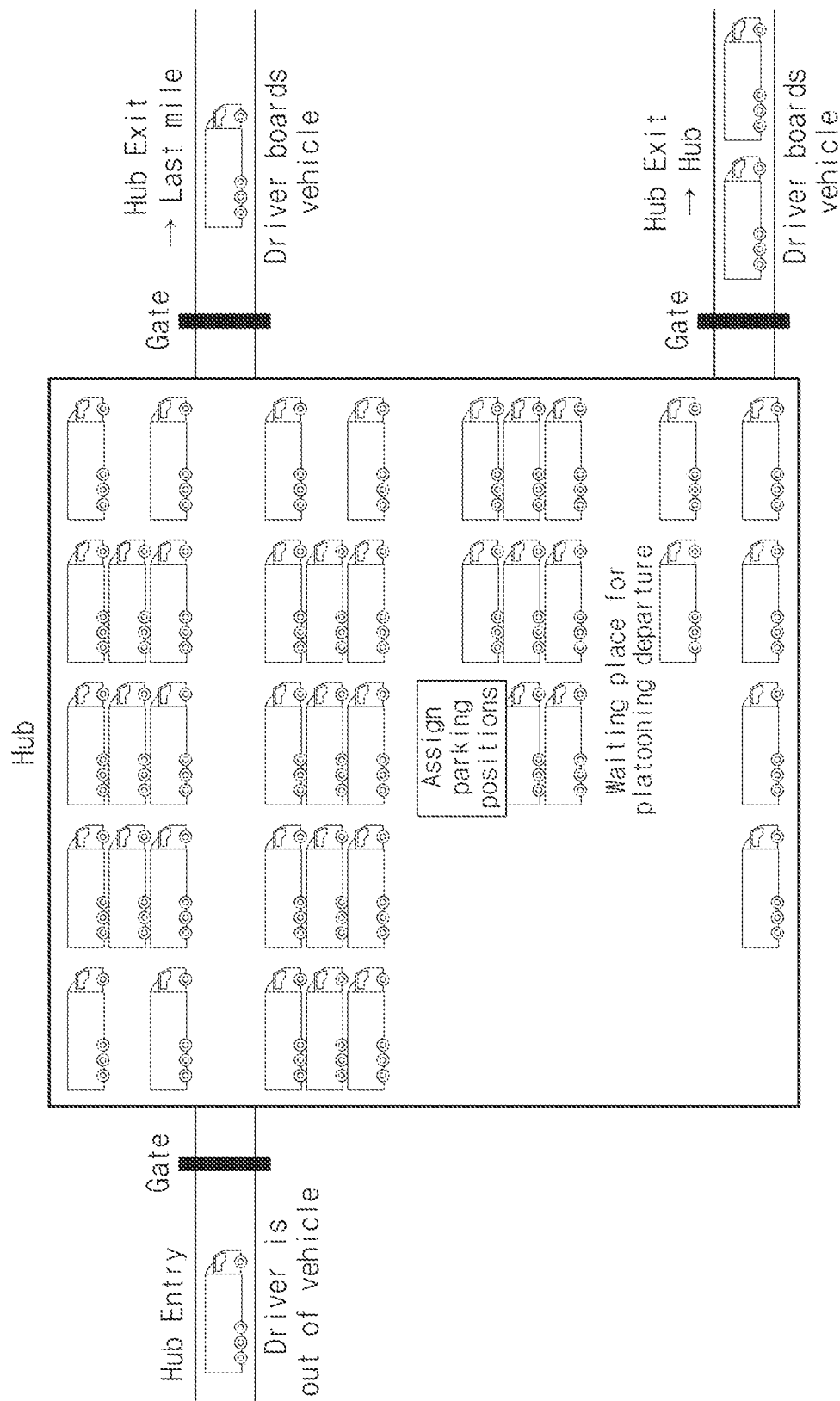
FIG. 4 illustrates an example of a screen for parking alignment of a platooning vehicle within a hub for hub-to-hub-based platooning control in some forms of the present disclosure.

Referring to FIG. 4, when a vehicle reaches a hub entry, a driver gets off and receives a parking position in the hub from the hub apparatus 100 and moves the vehicle to a corresponding parking position based on autonomous driving.

After that, the hub has an exit to another hub and an exit to a last mile section, vehicles leave one by one to the last mile section, and when exiting to another hub, they leave in the form of platooning.

Figure 5:
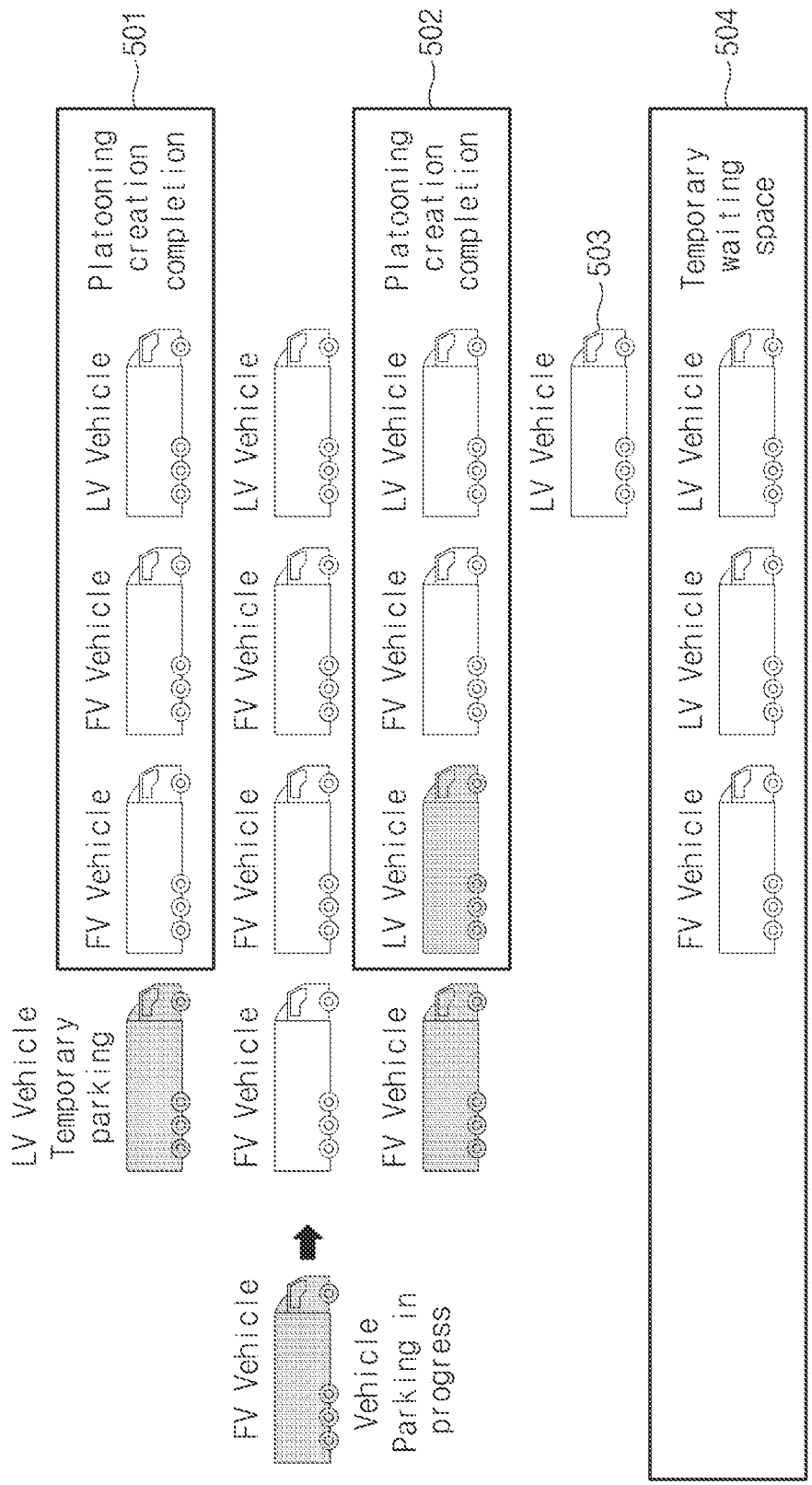
FIG. 5 illustrates an example of a screen for hub-to-hub parking position determination in some forms of the present disclosure.
Figure 6:
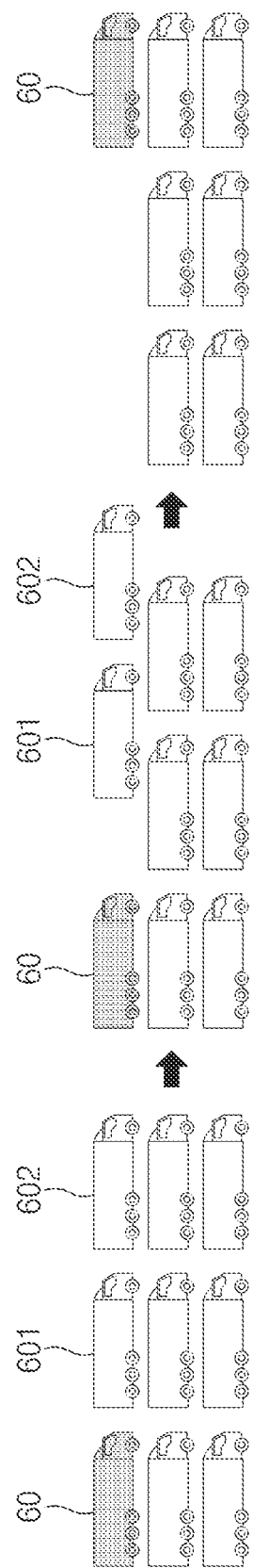
FIG. 6 illustrates an example of a screen for hub-to-hub parking position change in some forms of the present disclosure.

FIG. 5 illustrates an example of a screen for hub-to-hub parking position determination in some forms of the present disclosure, and FIG. 6 illustrates an example of a screen for hub-to-hub parking position change in some forms of the present disclosure.

When controlling the movement of vehicles in the hub, the hub apparatus 100 performs it based on autonomous driving control, and manages parking by row in the order of exit times. In addition, space consumption may be minimized by minimizing a distance between parked vehicles. That is, since door opening is unnecessary, the distance between the vehicles may be controlled within 10 cm, for example.

In addition, the hub apparatus 100 may remotely move some parked vehicles when the departure time is changed. That is, the hub apparatus 100 may perform a vehicle exit control by moving vehicles parked in a same row. In addition, the hub apparatus 100 may perform the vehicle exit control by dividing a vehicle moving to the last mile from a vehicle moving to another hub. In addition, it is possible to prevent possible problems when a vehicle leaves by checking whether the vehicle is malfunctioning when parking.

Referring to FIG. 5, in the case where a platooning vehicle group 501 which has completely parked is scheduled to leave 5 minutes later, when a vehicle LV temporarily parks behind the platooning vehicle group 501 and platooning vehicles of the platooning vehicle group 501 leave, the vehicle LV is controlled to move to a front thereof.

Referring to FIG. 6, in the case where a parking space exists behind vehicles 601 and 602 of a platooning vehicle group which has completely parked after an entry of a vehicle 60, when a parking region is empty as the vehicles 601 and 602 leave after the vehicle 60 parked at the parking space behind the vehicles 601 and 602, the vehicle 60 may be controlled to move to a front at which the platooning vehicle group has parked.

Figure 7:
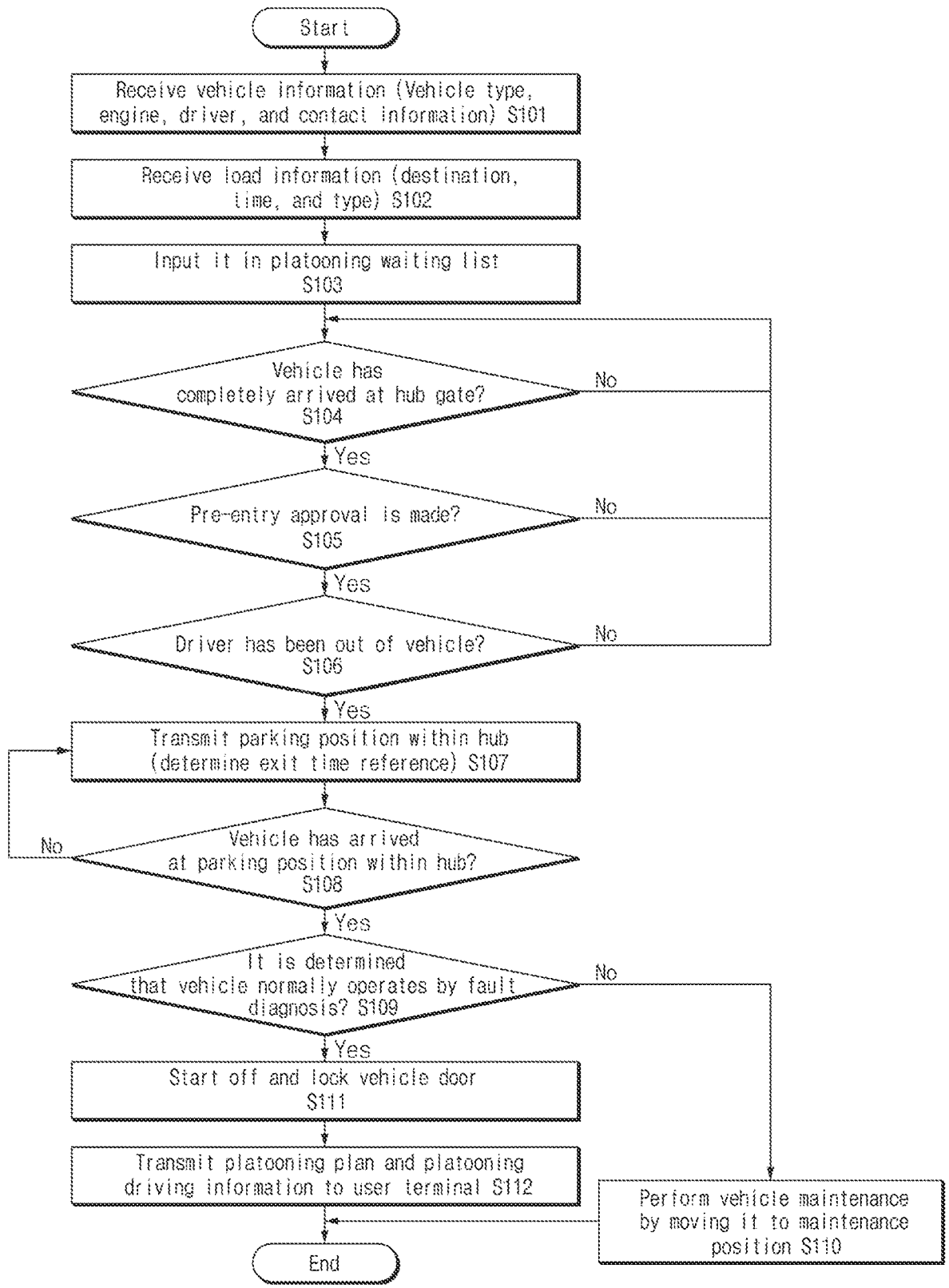
FIG. 7 illustrates a flowchart showing a method of controlling an entry of a platooning vehicle in a hub in some forms of the present disclosure.

Hereinafter, an entry control method of a platooning vehicle in a hub-to-hub-based hub in some forms of the present disclosure will be described in detail with reference to FIG. 7. FIG. 7 illustrates a flowchart showing a method of controlling an entry of a platooning vehicle in a hub in some forms of the present disclosure.

Hereinafter, it is assumed that the hub apparatus 100 of FIG. 1 performs a process of FIG. 7. In addition, in the description of FIG. 7, operations described as being performed by a device may be understood as being controlled by the processor 140 of the hub apparatus 100 for hub-to-hub-based platooning control.

Referring to FIG. 7, when moving to the hub, platooning vehicles or vehicles that will join platooning may transmit vehicle information and/or load information to the hub apparatus 100 before or after reaching the hub.

Accordingly, the hub apparatus 100 may receive vehicle information from the platooning vehicles (S101), and may receive load information (S102). In this case, the vehicle information may include a vehicle type, engine information, driver information, contact information, and the like. The load information may information destination information, load shipment time information, load type information, and the like.

The hub apparatus 100 inputs the vehicle information in a platooning waiting list (S103), and checks whether a vehicle has arrived at a hub gate (S104).

When the vehicle arrives at the hub gate, the hub apparatus 100 checks whether pre-entry approval has been completed (S105), and when the pre-entry approval is completed, determines whether a driver has been completely out of the vehicle (S106). In this case, the driver may get off at the entry of the hub, and after entering the hub, the vehicle may be autonomously controlled to be unmanned in the hub.

That is, the vehicle for which pre-entry approval has been completed may indicate a vehicle registered in advance, and the vehicle may request pre-entry approval through communication with the hub apparatus 100 to perform the approval.

After the driver has been completely out of the vehicle, the hub apparatus 100 determines a parking position in the hub based on the departure time of the vehicle entering the gate, a platooning role, etc., and transmits the parking position in the hub to the vehicle (S107).

Then, the hub apparatus 100 controls the vehicle to move to a corresponding parking position, determines whether the vehicle has arrived at the corresponding parking position (S108), and determines whether or not the vehicle normally operates by performing fault diagnosis of the vehicle (S109) when the vehicle arrives at the parking position.

When the vehicle is in a broken state, the hub apparatus 100 moves the vehicle to a maintenance position such that vehicle maintenance can be performed (S110).

When the vehicle is in a normal state, the hub apparatus 100 performs start-off of the vehicle and vehicle door lock control (S111).

Subsequently, the hub apparatus 100 transmits a platooning plan and platooning driving information to the user terminal 300 of the driver (S112).

Figure 8:
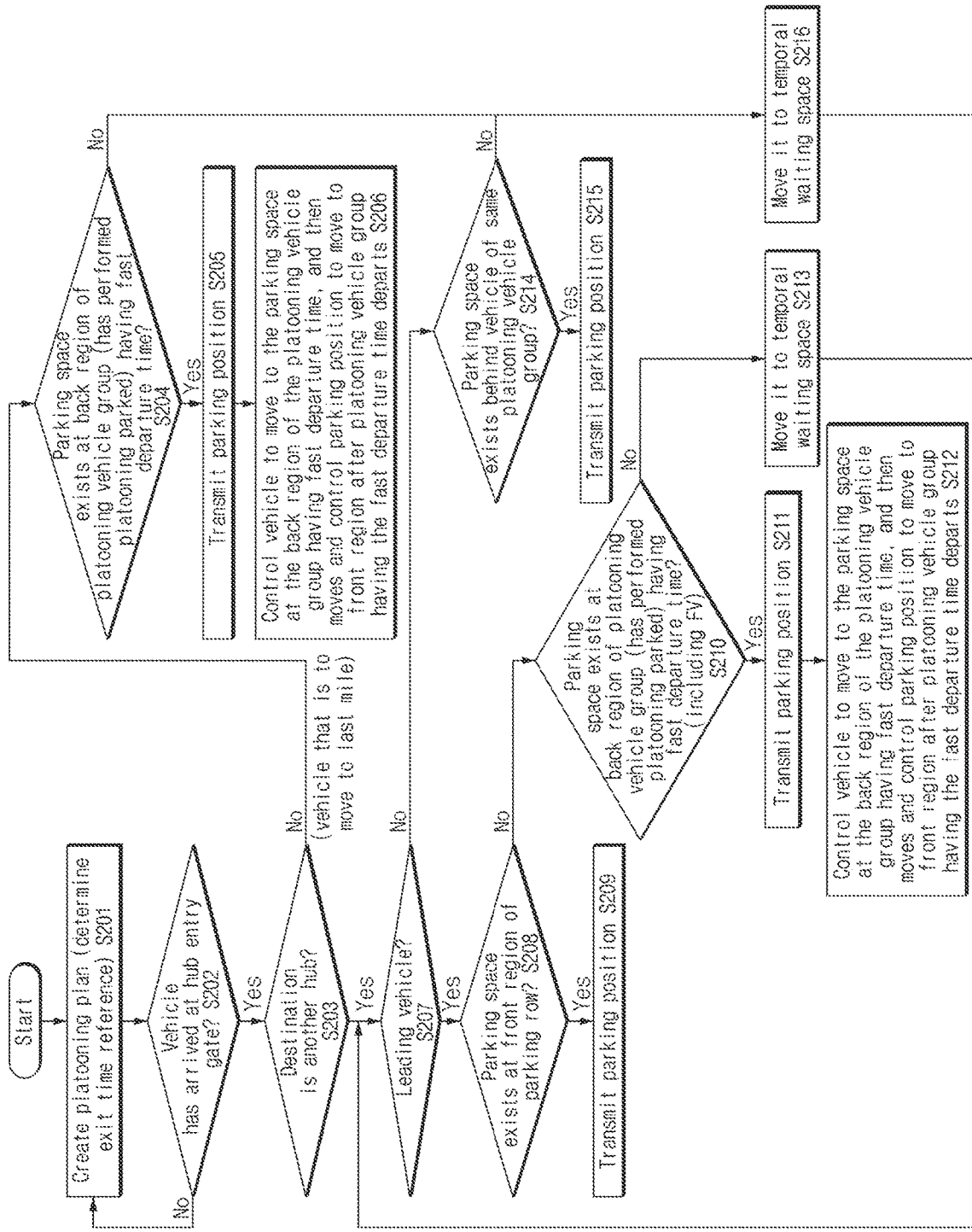
FIG. 8 illustrates a flowchart showing a method of controlling a parting position of a platooning vehicle in a hub in some forms of the present disclosure.

Hereinafter, a parking position control method of a platooning vehicle in a hub-to-hub-based hub in some forms of the present disclosure will be described in detail with reference to FIG. 8. FIG. 8 illustrates a flowchart showing a method of controlling a parting position of a platooning vehicle in a hub in some forms of the present disclosure.

Hereinafter, it is assumed that the hub apparatus 100 of FIG. 1 performs a process of FIG. 8. In addition, in the description of FIG. 8, operations described as being performed by a device may be understood as being controlled by the processor 140 of the hub apparatus 100 for hub-to-hub-based platooning control.

Referring to FIG. 8, the hub apparatus 100 creates a platooning plan (S201), determines whether a vehicle has arrived at a hub entry gate (S202), and when the vehicle arrives at a hub entry gate, determines whether a destination of the vehicle arriving at the hub entry gate is another hub (S203).

When the vehicle arriving at the hub entry gate is not a vehicle to be moved to another hub, the hub apparatus 100 determines that the vehicle is a vehicle to exit to a last mile section, and determines whether a parking space exists at a back region of a platooning vehicle group 501 (completing the platooning parking) with a fast departure time (S204).

When the parking space exists at the back region of the platooning vehicle group 501 (completing the platooning parking) with the fast departure time, the hub apparatus 100 transmits position information of the parking space at the back region of the platooning vehicle group 501 having the fast departure time to the vehicle arriving at the hub entry gate (S205), controls the vehicle arriving at the hub entry gate to move to the parking space at the back region of the platooning vehicle group 501, and then moves and controls the vehicle arriving at the hub entry gate to a front region after the platooning vehicle group 501 having the fast departure time departs (S206).

Meanwhile, when the vehicle arriving at the hub entry gate is a vehicle that will move to another hub, the hub apparatus 100 determines whether the vehicle is a leading vehicle (S207). In this case, the hub apparatus 100 may determine whether the vehicle is a leading vehicle or a following vehicle based on vehicle information and platooning plan information received from the vehicles.

In the case where the vehicle arriving at the hub entry gate is a leading vehicle 503, the hub apparatus 100 determines whether a parking space exists at a front region of a parking row (S208), and when the parking space at the front region of the parking row, transmits a corresponding parking position (the first region of the parking row) to the leading vehicle (S209).

On the other hand, in step S208, when no parking space exists at the front region of the parking row, the hub apparatus 100 determines whether a parking space exists at a back region of a platooning vehicle group 501 having a fastest departure time among platooning vehicle groups 501 and 502 that have been already completed platooning parking (S210).

When the parking space exists at the back region of the platooning vehicle group 501 having the fastest departure time, the hub apparatus 100 transmit position information of the parking space at the back region of the platooning vehicle group 501 having the fastest departure time to the corresponding vehicle (S211), and controls the vehicle to move to the back region of the platooning vehicle group 501 having the fastest departure time.

On the other hand, in step S210, when no parking space exists at the back region of the platooning vehicle group 501 having the fastest departure time, the hub apparatus 100 controls the vehicle to move to a temporary waiting space 504 (S213).

Meanwhile, in step S207, when the vehicle arriving at the hub entry gate is not the leading vehicle, it is the following vehicle, and thus the hub apparatus 100 determines whether a parking space exists behind a vehicle of a same platooning vehicle group as that of the following vehicle (S214).

When the parking space exists behind the vehicle of the same platooning vehicle as that of the following vehicle, the hub apparatus 100 transmits a corresponding position to the following vehicle as parking position information, and controls the following vehicle to move to the corresponding parking position.

Meanwhile, when no parking space exists behind the vehicle of the same platooning vehicle as that of the following vehicle, the hub apparatus 100 controls the vehicle to move to the temporary waiting space 504 (S216).

Figure 9:
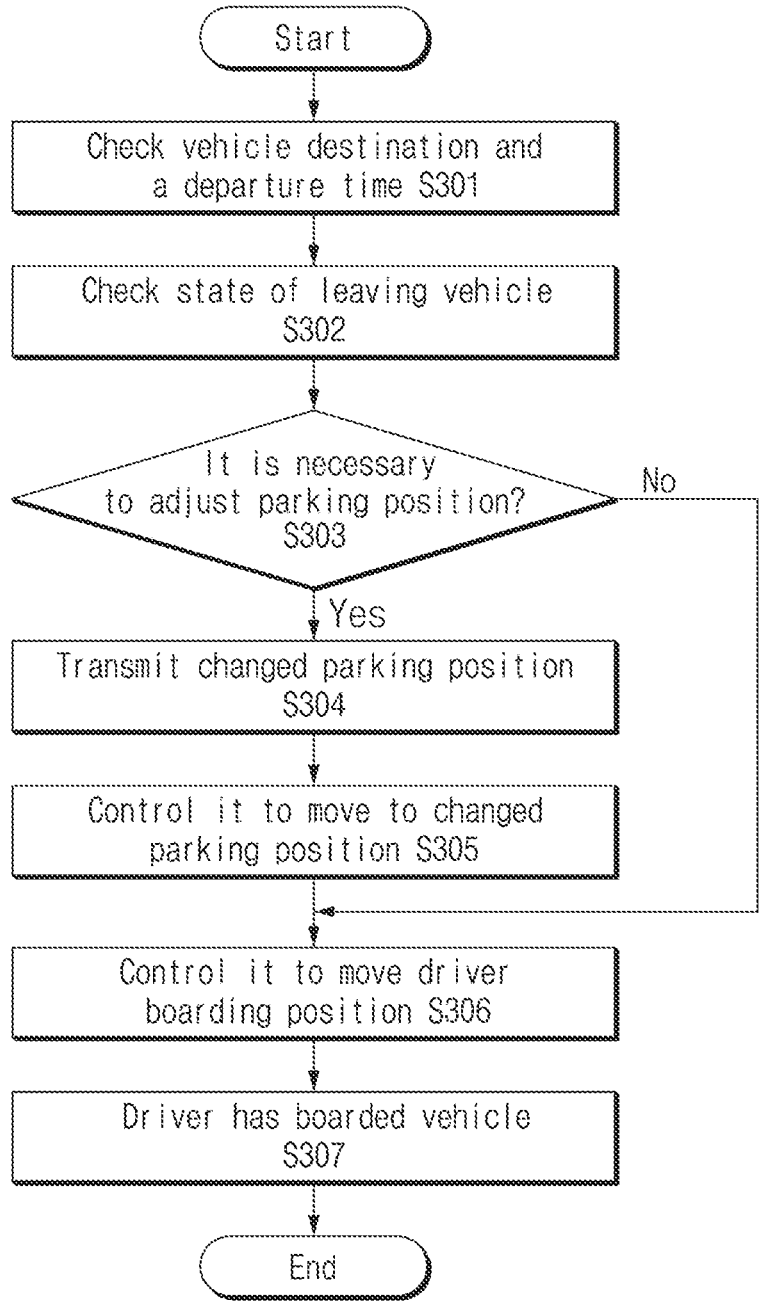
FIG. 9 illustrates a flowchart showing a method of controlling an exit of a platooning vehicle in a hub in some forms of the present disclosure.

Hereinafter, an exit control method of a platooning vehicle in a hub-to-hub-based hub in some forms of the present disclosure will be described in detail with reference to FIG. 9. FIG. 9 illustrates a flowchart showing a method of controlling an exit of a platooning vehicle in a hub in some forms of the present disclosure.

Hereinafter, it is assumed that the hub apparatus 100 of FIG. 1 performs a process of FIG. 9. In addition, in the description of FIG. 9, operations described as being performed by a device may be understood as being controlled by the processor 140 of the hub apparatus 100 for hub-to-hub-based platooning control.

Referring to FIG. 9, the hub apparatus 100 checks a vehicle destination and a departure time (S301), and checks a state of the leaving vehicle (S302). In this case, the hub apparatus 100 may determine whether a vehicle that has not yet started exists in front of the leaving vehicle.

The hub apparatus 100 may determine whether parking position adjustment is required, that is, whether a vehicle parked in a same row needs to move (S303).

When the parking position adjustment is required, the hub apparatus 100 transmits a changed parking position to the vehicle (S304), and controls the vehicle to move to the changed parking position (S305).

Subsequently, the hub apparatus 100 controls the vehicle to move to a driver boarding position (S306), and the vehicle moves to a destination after a driver boards the vehicle (S307).

As such, in some forms of the present disclosure, it is possible to enhance vehicle security by controlling hub-to-hub entry and exit. In addition, in some forms of the present disclosure, it is possible to reduce costs and prevent safety accidents in a parking section by promoting the parking section in a unmanned way in the hub, and cost reduction is possible by maximizing parking efficiency by minimizing parking distances during parking control. In some forms of the present disclosure, platooning vehicle group are created within the hub, so that efficiency of creating the platooning vehicle group can be excellent and driving related costs can be reduced.

Figure 10:
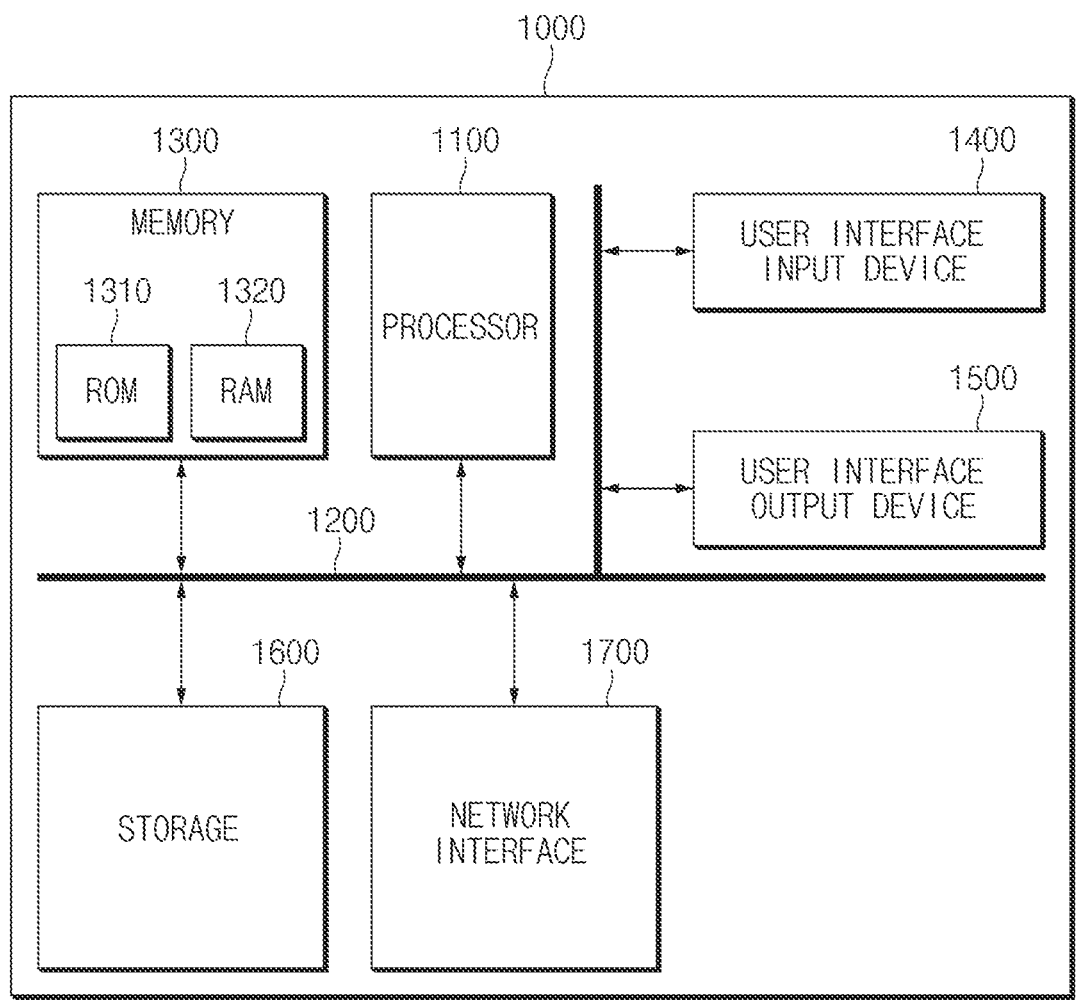
FIG. 10 illustrates a computing system in some forms of the present disclosure.

FIG. 10 illustrates a computing system in some forms of the present disclosure.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary forms disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary forms disclosed in the present disclosure are not intended to limit the technical ideas of the present disclosure, but to explain them, and the scope of the technical ideas of the present disclosure is not limited by these exemplary forms. The protection range of the present disclosure should be interpreted by the claims below, and all technical ideas within the equivalent range should be interpreted as being included in the scope of the present disclosure.

What is claimed is:

1. A hub apparatus comprising:
 a processor configured to control at least one of entry, parking, or exit of a platooning vehicle traveling from hub to hub; and
 a storage configured to store data and algorithms driven by the processor,
 wherein the processor is configured to:
  control the platooning vehicle to move to a parking position within a hub based on autonomous driving control after a driver exits the platooning vehicle when the platooning vehicle arrives at a gate of the hub,
 wherein the processor is further configured to:
  pre-receive vehicle information and load information from a plurality of vehicles before arriving at the gate of the hub;
  determine parking positions in the hub of vehicles that participate in a platooning vehicle group based on the pre-receiving vehicle information and load information;
  determining whether the vehicle arriving at the gate is a vehicle moving to another hub or a last mile vehicle; and
  when the vehicle is the last mile vehicle, controlling the vehicle to move to the parking position around a last mile exit of the hub to which vehicles leave one by one, and when the vehicle is the vehicle moving to another hub, controlling the vehicle to move the parking position around an exit to which the vehicles leave in a form of platooning.

2. The hub apparatus of claim 1, wherein the processor is configured to:
 create a platooning plan; and
 register the plurality of vehicles before arriving at the gate of the hub in a platooning waiting list using the pre-receiving vehicle information and load information from the plurality of vehicles.

3. The hub apparatus of claim 2, wherein the processor is configured to:
 determine whether pre-entry approval of the platooning vehicle is made based on the platooning waiting list when the platooning vehicle arrives at the gate of the hub.

4. The hub apparatus of claim 2, wherein the processor is configured to:
 create a plurality of paths to a destination based on vehicle information for each vehicle;
 transmit the plurality of paths to the plurality of vehicles; and
 make the platooning plan based on at least one of the plurality of paths selected from the plurality of vehicles, a platooning departure time, a platooning creation place, vehicle information to participate in a platooning vehicle group, or platooning role information.

5. The hub apparatus of claim 1, wherein the processor is configured to:
 determine the parking positions in the hub of vehicles that participate in the platooning vehicle group based on a platooning departure time and platooning role information.

6. The hub apparatus of claim 1, wherein the processor is configured to:
 perform a fault diagnosis of the platooning vehicle when the platooning vehicle arrives at a parking position in the hub.

7. The hub apparatus of claim 6, wherein the processor is configured to:
 control the platooning vehicle to move to a maintenance position in the hub when the platooning vehicle is in a fault condition as a result of the fault diagnosis.

8. The hub apparatus of claim 6, wherein the processor is configured to:
 perform starting-off control of the platooning vehicle when it is in a normal state as a result of the failure diagnosis.

9. The hub apparatus of claim 8, wherein the processor is configured to:
 perform door lock control of the platooning vehicle after the starting-off control of the platooning vehicle.

10. The hub apparatus of claim 1, wherein the processor is configured to:
 check a destination and an exit time of the platooning vehicle;
 determine whether adjustment of a parking position of a vehicle for exit is necessary; and
 when it is determined that the adjustment of the parking position of the vehicle for exit is necessary, control the platooning vehicle to move to a changed parking position by transmitting the changed parking position to the vehicle.

11. The hub apparatus of claim 10, wherein the processor is configured to:
 control the platooning vehicle to move to a driver boarding position when the platooning vehicle leaves.

12. The hub apparatus of claim 1, wherein the processor is configured to:
 determine whether the platooning vehicle is a leading vehicle when it is determined that the platooning vehicle is moving to another hub.

13. The hub apparatus of claim 12, wherein the processor is configured to:
 when it is determined that the platooning vehicle is the leading vehicle, determine whether a parking space exists at a front region of parking rows within the hub; and
 when it is determined that the parking space exists at the front region of the parking rows within the hub, transmit, to the platooning vehicle, a parking position of the parking space at the front region of the parking rows within the hub to control the platooning vehicle to move to the parking space at the front region of the parking rows within the hub.

14. The hub apparatus of claim 12, wherein the processor is configured to:
  when it is determined that no parking space exists at the front region of the parking rows within the hub, determine whether a parking space exists at a back region of a platooning vehicle group having an earliest departure time among platooning vehicle groups that have been completed platooning parking.

15. The hub apparatus of claim 14, wherein the processor is configured to:
  when it is determined that the parking space exists at the back region of the platooning vehicle group having the earliest departure time, control the platooning vehicle to move to the parking space at the back region of the platooning vehicle group having the earliest departure time;
  park the platooning vehicle at the parking space at the back region of the platooning vehicle group having the earliest departure time to wait; and
  change a parking position of the platooning vehicle by controlling the platooning vehicle to move to a front region of a parking space at which the platooning vehicle group having the earliest departure time has been parked after leaving.

16. The hub apparatus of claim 14, wherein the processor is configured to:
  when it is determined that no parking space exists at the back region of the platooning vehicle group having the earliest departure time, control the platooning vehicle to move to a temporary waiting space.

17. The hub apparatus of claim 12, wherein the processor is configured to:
  when the platooning vehicle is a following vehicle, determine whether a parking space exits at a back region of a same platooning vehicle group as that of the platooning vehicle;
  when it is determined that the parking space exists at the back region of the same platooning vehicle group as that of the platooning vehicle, control the platooning vehicle to move to the parking space at the back region of the same platooning vehicle group as that of the platooning vehicle; and
  when it is determined that no parking space exists at the back region of the same platooning vehicle group as that of the platooning vehicle, control the platooning vehicle to move to a temporary waiting space.

18. The hub apparatus of claim 1, wherein the processor is configured to:
  when a vehicle arriving at the gate is the last mile vehicle, determine whether a parking space exists at a back region of a platooning vehicle group having an earliest departure time among platooning vehicle groups that have been completed platooning parking;
  when the parking space exists at the back region of the platooning vehicle group having the earliest departure time, control the platooning vehicle to move to the parking space at the back region of the platooning vehicle group having the earliest departure time;
  park the platooning vehicle at the parking space at the back region of the platooning vehicle group having the earliest departure time; and
  change a parking position of the platooning vehicle by controlling the platooning vehicle to move to a front region of a parking space at which the platooning vehicle group having the earliest departure time has been parked after leaving.

19. A platooning control method for controlling a platooning vehicle traveling from hub to hub, the method comprising:
  pre-receiving vehicle information and load information from a plurality of vehicles before arriving at a gate of the hub;
  determining parking positions in the hub of vehicles that participate in a platooning vehicle group based on the pre-receiving vehicle information and load information;
  determining whether pre-entry approval of the platooning vehicle is made when the platooning vehicle arrives at the gate of the hub;
  when it is determined that the pre-entry approval is made, controlling the platooning vehicle to move to a parking position within the hub based on autonomous driving control after a driver exits the platooning vehicle;
  determining whether the vehicle arriving at the gate is a vehicle moving to another hub or a last mile vehicle; and
  when the vehicle is the last mile vehicle, controlling the vehicle to move to the parking position around the last mile exit to which vehicles leave one by one, and when the vehicle is the vehicle moving to another hub, controlling the vehicle to move the parking position around an exit to which the vehicles leave in a form of platooning.

* * * * *